Aug. 11, 1970 A. H. LYBECK 3,523,862

CONDUCTIVE METAL CHEMICALLY BONDED TO PLASTIC SUBSTRATE

Filed Sept. 6, 1966

INVENTOR

ALVIN H. LYBECK

BY

United States Patent Office 3,523,862

Patented Aug. 11, 1970

3,523,862

CONDUCTIVE METAL CHEMICALLY BONDED TO PLASTIC SUBSTRATE

Alvin H. Lybeck, Mansfield Center, Conn., assignor to American Enka Corporation, Enka, N.C., a corporation of Delaware Filed Sept. 6, 1966, Ser. No. 577,214

Int. Cl. B32b *15/08, 27/34, 27/42*

U.S. Cl. 161—217 2 Claims

ABSTRACT OF THE DISCLOSURE

An electrically conductive laminate comprising a conductive layer of copper, a layer of copper oxide adhered to said copper, a bonding layer of particulate polyethylene, a peroxide and an allyl cyanurate applied from a solvent solution; and a substantially rigid non-conducting plastic supporting layer.

This invention relates to a new and improved method for bonding electrically conductive layers to dielectric materials and particularly for bonding thin film electrically conductive metals to rigid plastic structures which are suitable for manufacture of precision electrical structural components such as capacitors and printed circuit wiring panels.

Laminates composed of thin sheets of conductive metal bonded to comparatively thick and rigid supporting sheets of an insulating plastic such as those formed from polymerized olefins and/or various other saturated and unsaturated synthetic resins are used in the production of electrical panels and have found particular utility in the manufacture of printed circuits. Most conventional methods of making the panels rely upon merely mechanically bonding metal sheets to the plastic supporting structure by applying heat and pressure to form a rigid metal-to-plastic laminate which then can be chemically or mechanically treated to form the desired wiring circuit arrangements. Yet, panels produced by following mechanical bonding procedures heretofore known are found to be unsuitable in many applications where extremely close tolerances and precision are necessary since an incomplete bond often exists between the metal and supporting plastic structure. For example, a panel having an incompletely bonded portion throughout the planar surface, sometimes called "blistering," is obtained when following the method which renders the panels unsuitable for further mechanical or chemical placement of the circuit arrangement. Blistering can also be caused by certain inherent characteristics of many of the plastics preventing bonding or adherence thereof to metals.

A more recent procedure in efforts to prevent blistering in the product panels involves using a bonding-adhesive interlayer between a conducting sheet and a rigid structural plastic supporting sheet. This approach generally involves applying an adhesive to the rigid plastic sheet and then using the heretofore described conventional heat-pressure laminating technique but wherein the thin metallic conducting sheet is mostly adhesively bonded thereto. In a preferred method among panel manufacturers, the plastic is first conventionally prepared by polymerizing suitable reactants, for example, known mixtures fo monomeric divinylbenzene (DVB) and styrene in molds and under a suitable atmosphere of pressure and temperature. This method permits obtaining structures that can be further machined to an appropriate thickness, length and width suitable for lamination and using known bonding or adhesive agents. Thus, in effect, the interlayer, usually a liquid-solid composite or mixture, serves as a bonding medium for the metal foil and the rigid non-conducting plastic support structure.

While it is possible to obtain some improved degree of panel uniformity by this method, blistering is still found to be a problem and in most cases it can be directly attributed to the use of conventional bonding agents or adhesives. The use of adhesives heretofore known and, for example, the commonly used epoxy resins (a reaction product of bisphenol and epichlorohydrin) is definitely a limiting factor in obtaining the electrical and other physical properties necessary to obtain a satisfactory panel. This can be readily appreciated when one understands that the requirements of a satisfactory adhesive for bonding plastic supporting structures to a metal are demanding and numerous. To have acceptable utility in commercial operations, the adhesive must withstand long storage before use, must be easily applied and must dry rapidly because of the short duration under which they are subjected to heat and pressure. The adhesive must be stable and effective in high pressure bonding techniques in an effort to produce a panel laminate having a union of high strength and moreover, it must not adversely affect the electrically conducting and insulating properties of the panel. Known adhesives do not satisfy the multifarious requirements and, consequently, it has been very difficult to bond a metal layer to a supporting plastic sheet which is, in every case, completely acceptable in further processing of various electrical components.

Therefore, it is a principal object of this invention to provide a metal-to-plastic laminated article and method of making same which has improved electrical properties and which is relatively inexpensive to manufacture.

It is another object of this invention to provide a rigid metal-to-plastic laminate with improved electrical properties with a degree of uniformity hitherto unavailable.

According to this invention, there is provided a composition and process for producing a composite plastic and conducting panel clad or coated with a thin layer of conducting metal. The invention envisions using a novel bonding or adhesive interlayer composition between a non-conducting support structure and a conducting metal layer comprising a mixture of particulate polyethylene, triallyl cyanurate, and organic peroxide in a suitable solvent or liquid carrier vehicle, such as a diluent which can be applied in the form of a coating directly to the surface of the non-conducting structure and which is stable when being subjected to heat and pressure, and particularly at a temperature, pressure and time necessary to cause the conductor to positively adhere to the structure and in some degree when attached to or at least partially embedded in the structure.

In describing the novel adhesive interlayer of the invention, it is preferred that it be of the volatile solvent-plasticized resin type and consist essentially of a lesser portion of each particulate or powdery polyethylene, dicumyl peroxide and triallyl cyanurate and a major portion solvent, preferably toluene. Although dicumyl peroxide is preferred, generally peroxide having the following formula:

$$R^1—O—O—R^2$$

where $R^1$ and $R^2$ is selected from the group consisting of alkyl, cycloalkyl, aryl, alkaryl, aralkyl and aryl radicals, is believed suitable.

While triallyl cyanurate is intended to be embraced by a preferred embodiment, trimethallyl cyanurate and triallyl isocyanurate are also believed suitable in preparing the new interlayer adhesive compositions.

A number of ethylene polymers may be used and those having additives to improve the properties thereof may be included. It is preferred that those having a softening point at least as low as 100° C. and of a particle size or fineness so as to pass through about 80 mesh screen be used.

The materials employed in forming the novel adhesive interlayer used in the present process are preferably in finely divided form and made up into a slurry and in a volatile solvent such as toluene. Certainly other solvents possibly could be used, however, and exemplary of these are the lower alkanols, methanols, ethanols, or the cyclic ethers such as dioxane or the aliphatic ketones such as acetone and/or methyl ethyl ketone and water. Toluene is chosen as solvent simply because it is known to have slightly more activity in contact with polyolefins used as the plastic support structure, although any solvent could possibly be used. What is of more importance is that the solvent is not essential to the successful accomplishment of adhesion given suitable physical admixture of the active components. The use of solvent actually is a matter of convenience to facilitate handling of these active materials. In selecting other solvents and/or diluents, it should be understood that ones causing undesirable interreactions and including those causing swelling of the major solid components of the mixture should be avoided. The slurry can be directly applied to the surface of the plastic structure and allowed to air dry or it can, almost immediately, be faced with commercially available metal sheets or foils. Air drying before applying the sheet is preferable, however.

In manufacture of the laminated panel, it is also preferred that the preform metal layer be first provided with an oxide coating or film and this can be accomplished by immersing a sheet of the metal, for example copper, in a chemical oxidizing agent. While certainly other oxidizing agents may be used, a hot alkaline chloride solution has been found suitable. The sheet is immersed and held in the solution until one side or surface thereof turns black. The period of immersion ranges from approximately 5–10 minutes when maintaining the solution at ambient temperatures. The copper sheet having the black oxide film thereon can then be stacked or otherwise placed on the preformed rigid plastic supporting structure with the oxide film in direct contact with the novel adhesive interlayer.

It is preferred that the rigid plastic supporting structures be made from a copolymer of divinylbenzene and styrene and wherein divinylbenzene (DVB) comprises 6–7%, based on the weight of sytrene. It has been found that rigid panels made from DVB-styrene have many improved properties over panels made when using other resins. The arc resistance is higher, the surface resistivity is higher and, perhaps more importantly, the moisture absorption of the polymerized structure is practically zero. Moreover, DVB-styrene resin panels withstand heat and resist attendant deformation in the various environments in which they are used much better than other plastics which possibly could be employed. This is not to say, however, that the novel adhesive interlayer would not possibly be effective with other plastics. Examples of others which may possibly be used are the suitable electrical grade phenol-formaldehyde and anilineformaldehyde synthetic resins, urea formaldehyde and melamineformaldehyde resins, and the polyacrylics such as Lucite-(polymethyl methacrylate). Structural synthetic high polymeric materials such as nylon and polyethylene terephthalate may also be used.

Various organic fillers may be included in the preferred plastic structures and some of these are asbestos, mica and/or glass fibers. Styrene and DVB and/or similar mixtures may contain a variety of additives designed to impart specific properties or to influence the process in some manner, such as reduction of cure time.

For a more complete understanding of the invention, reference is made to the following detailed description taken in conjunction with the accompanying drawings wherein.

Figure 1:
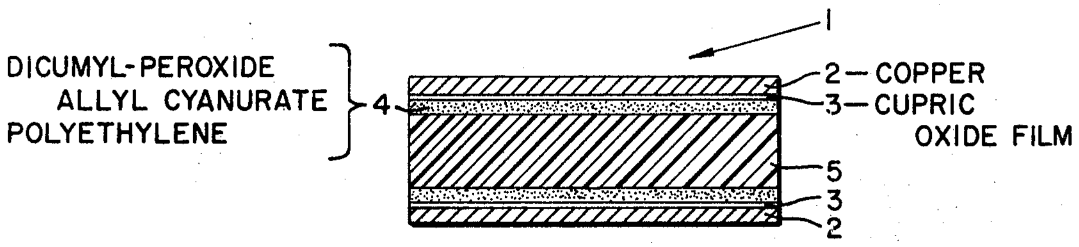
FIG. 1 is a sectional view of the panel laminate of the invention.

Referring now particularly to FIG. 1 of the drawing, panel 1 comprises a sheet of copper 2 having an oxide film 3 on one surface thereof.

Adhered to the cupric oxide film 3 of sheet 2 is adhesive layer 4 and comprising the novel slurry of the instant invention. Adhesive layer 4 also adheres to rigid divinylbenzene and styrene supporting layer 5.

Figure 2:
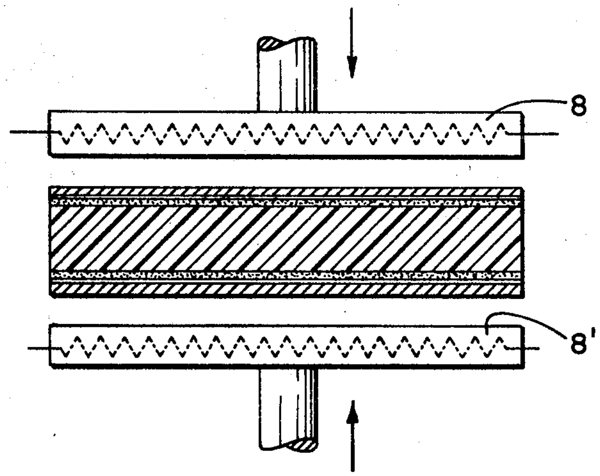
FIG. 2 is a diagrammatic view of the heat pressure laminating step used in manufacturing the electrically conducting laminated panel.

The loosely assembled laminate is then stacked between platens 8 and 8', as seen in FIG. 2, wherein suitable heat and pressure can then be applied to form the product panel.

The present invention is not limited to any particular means for applying the adhesives into layers and, therefore, any particular means may be used such as a whirl coating, either with or without a heat dip coating, spray coating, bead application on a continuous coating machine, wick applications to a continuously moving web or hopper coating, etc. Drying of the adhesive solution to remove the volatile solvents may be effected at room temperature or at elevated temperatures or under the influence of pressure.

EXAMPLE I

A mixture is prepared by rapidly stirring finely divided polyethylene powder with triallyl cyanurate and dicumyl peroxide into toluene. The mixture consists of 25% Microthene NF 500 (manufactured by the U.S. Industrial Chemical Company), 12.5% of triallyl cyanurate, and 12.5% dicumyl peroxide in 50% toluene. After stirring for several minutes at room temperature, the adhesive is applied to the preformed divinylbenzene styrene supporting sheet and air dried for approximately 5 minutes. The adhesive slurry permits ease of handling and quick alignment of approximately 2 ounce oxidized copper sheets placed thereon. After cutting to size and fitting the copper sheet to the plastic support sheet, the loosely assembled composite is then placed between the opposed platens which are then brought together to supply heat and pressure thereto. The platens are at a temperature sufficient to heat the adhesive to the recommended curing temperature of approximately 125° C. and for approximately 15 minutes. The pressure being applied is sufficient to cause the adhesive to be cured and directly bond the surface copper to the plastic support structures.

The use of the novel adhesive interlayer results in a bond of 12 pounds per square inch when tested by removing a one square inch of copper from the surface of the specimen at a direction perpendicular to the specimen and at a uniform rate of 10 inches per minute.

A series of formulations were designed to evaluate the effects of each of the three necessary ingredients included in the mixture according to the invention.

TABLE I

| Run | Microthene NF 500 [1] (Percent) | Triallyl Cyanurate (Percent) | Dicumyl peroxide | Solvent, percent | Bond Str. (lbs./sq. in.) |
|---|---|---|---|---|---|
| 1 | 0 | 50 | 0 | 50 | 0 |
| 2 | 50 | 0 | 0 | 50 | 0 |
| 3 | 0 | 0 | 50 | 50 | 0 |
| 4 | 30 | 15 | 0 | 50 | 0 |
| 5 | 0 | 25 | 25 | 50 | 4 |
| 6 | 30 | 0 | 15 | 50 | 7 |
| 7 | 25 | 12.5 | 12.5 | 50 | 12 |

[1] Particulate polyethylene manufactured by U.S. Industrial Chemical Company.

Thus, the foregoing table indicates an additive and beneficial adhesive effect and particularly when using the mixture combination according to the invention. While not wishing to be bound by any particular theory, it is believed that a covalent network polymer is formed between the triallyl cyanurate and polyethylene wherein dicumyl peroxide serves to catalyze and essentially cause copolymerization thereof when under the influence of heat and pressure. This phenomenon therefore results in a complete bond between metallic layer and the plastic support.

While the preferred amounts of the constituents of the mixture are given in the example and Run 7 of the table. the amounts can vary. For example, the amount of triallyl cyanurate in percent and based on polyethylene should be between 25 and 100%. The amount of dicumyl peroxide (based on polyethylene) should be between 25 and 100%.

It will be further readily seen by those skilled in the art that the novel procedure using the adhesive has the distinct advantage that the final thickness of the panel will be substantially uniform throughout all planar areas, and there is no problem in forming extremely fine conductive layers which are necessary to render a precise pattern for printed circuit type applications.

While the invention has been described in particularity to using sheets of metal foils, it will be appreciated that particulate metals can also be used and can be readily deposited without masking. The metals can be applied by various means including vacuum deposition, spraying, cathode sputtering, or emulsive type dip coatings. All of the coatings applied to the adhesive are substantially independent of humidity or moisture which makes them especially useful as conductive overcoats on insulating surfaces and which can be used in manufacture of photographic film, fabrics, and the like.

What is claimed is:

1. An electrically conductive laminated article comprising in combination:

(a) a conductive layer of copper;

(b) a layer of copper oxide adhered to a surface of said copper conductive layer;

(c) a substantially rigid and non-conductive plastic layer selected from the group consisting of a divinylbenzene - styrene copolymer, phenol - formaldehyde, aniline-formaldehyde, urea-formaldehyde, melamine-formaldehyde, nylon, polyethylene terephthalate, and polyacrylic resins, and (d) an intervening adhesive layer bonding said plastic layer to said oxide layer said adhesive layer comprising polyethylene particles cross-linked in the presence of dicumyl peroxide catalyst by an allyl cyanurate selected from the group consisting of triallyl cyanurate, trimethyl cyanurate and triallyl isocyanurate.

2. An electrically conductive laminated article comprising a combination:

(a) a conductive layer of copper;

(b) a layer of copper oxide adhered to a surface of said conductive layer of copper;

(c) a substantially rigid and non-conductive plastic supporting layer of a copolymer of divinylbenezene and styrene, and (d) a layer of particulate polyethylene cross-linked in the presence of dicumyl peroxide catalyst by triallyl cyanurate bonding said plastic supporting layer to said layer of copper oxide.

References Cited

UNITED STATES PATENTS

| | | | |
|---|---|---|---|
| 3,137,674 | 6/1964 | Marans et al. | 260—878 |
| 3,240,662 | 3/1966 | Smyers et al. | 260—94.9 |
| 3,294,869 | 12/1966 | Robinson | 260—878 |
| 3,318,758 | 5/1967 | Tell | 161—216 |
| 3,351,604 | 11/1967 | Safford et al. | 260—878 |

JOHN T. GOOLKASIAN, Primary Examiner

W. E. HOAG, Assistant Examiner

U.S. Cl. X.R.

161—216, 219, 248, 254, 253; 260—878; 117—132, 138.8; 156—331